United States Patent
Pfau et al.

(10) Patent No.: US 8,260,495 B2
(45) Date of Patent: Sep. 4, 2012

(54) METHOD FOR REDUCING AUDIBLE NOISE IN A VEHICLE

(75) Inventors: Douglas Allen Pfau, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 643 days.

(21) Appl. No.: 12/241,603

(22) Filed: Sep. 30, 2008

(65) Prior Publication Data

US 2010/0082201 A1   Apr. 1, 2010

(51) Int. Cl.
*G10K 11/16* (2006.01)
(52) U.S. Cl. ....... 701/36; 381/71.4; 381/94.1; 381/94.3; 415/119; 701/1; 701/49
(58) Field of Classification Search ................. 381/71.4, 381/94.1–94.9; 415/119; 701/1, 29, 36, 701/49
See application file for complete search history.

(56) References Cited

U.S. PATENT DOCUMENTS

| | | | | |
|---|---|---|---|---|
| 5,010,739 A | * | 4/1991 | Isshiki et al. | 62/158 |
| 5,162,709 A | * | 11/1992 | Ohi | 318/400.2 |
| 5,221,185 A | * | 6/1993 | Pla et al. | 416/34 |
| 5,293,578 A | * | 3/1994 | Nagami et al. | 381/71.14 |
| 5,499,301 A | * | 3/1996 | Sudo et al. | 381/71.3 |
| 5,748,748 A | * | 5/1998 | Fischer et al. | 381/71.4 |
| 5,907,622 A | | 5/1999 | Dougherty | |
| 5,950,440 A | * | 9/1999 | Niimi et al. | 62/133 |
| 5,995,632 A | * | 11/1999 | Okada | 381/71.3 |
| 6,278,377 B1 | | 8/2001 | DeLine et al. | |
| 6,420,975 B1 | | 7/2002 | DeLine et al. | |
| 6,427,103 B2 | * | 7/2002 | Kobayashi et al. | 701/36 |
| 6,466,136 B2 | | 10/2002 | DeLine et al. | |
| 6,529,608 B2 | | 3/2003 | Gersabeck et al. | |
| 6,717,524 B2 | | 4/2004 | DeLine et al. | |
| 6,755,616 B1 | * | 6/2004 | Tzeng | 416/1 |
| 6,906,632 B2 | | 6/2005 | DeLine et al. | |
| 6,931,873 B2 | * | 8/2005 | Oomura et al. | 62/228.4 |
| 7,012,507 B2 | | 3/2006 | DeLine et al. | |
| 7,024,871 B2 | * | 4/2006 | Zhu et al. | 62/133 |
| 7,282,873 B2 | * | 10/2007 | Abali et al. | 318/41 |
| 7,348,741 B2 | * | 3/2008 | Minekawa et al. | 318/268 |
| 7,387,498 B2 | * | 6/2008 | Schnetzka et al. | 417/4 |
| 2001/0011200 A1 | * | 8/2001 | Kobayashi et al. | 701/36 |
| 2003/0200014 A1 | * | 10/2003 | Remboski et al. | 701/29 |
| 2005/0094823 A1 | * | 5/2005 | Kobori et al. | 381/71.5 |
| 2005/0237717 A1 | * | 10/2005 | Babb et al. | 361/697 |
| 2008/0073057 A1 | * | 3/2008 | Kojima et al. | 165/43 |
| 2009/0002939 A1 | * | 1/2009 | Baugh et al. | 361/687 |

(Continued)

FOREIGN PATENT DOCUMENTS

JP    60004741 A  * 1/1985

(Continued)

OTHER PUBLICATIONS

Kenji Yoshikawa, Cooling Control Device of on-vehicle Electric Device, May 21, 2003, JPO, JP 2003-148144 A, English Abstract.*

(Continued)

*Primary Examiner* — Paul N Dickson
*Assistant Examiner* — James English
(74) *Attorney, Agent, or Firm* — Dickinson Wright PLLC

(57) ABSTRACT

A method for reducing noise in a vehicle by adjusting the rotational speed of various rotational components.

14 Claims, 2 Drawing Sheets

U.S. PATENT DOCUMENTS

2009/0304199 A1* 12/2009 Demoss .................. 381/71.1
2010/0079094 A1* 4/2010 Beltman et al. ........... 318/460
2010/0080399 A1* 4/2010 Pfau et al. ................ 381/71.4

FOREIGN PATENT DOCUMENTS

| JP | 10197034 | | 7/1998 |
| --- | --- | --- | --- |
| JP | 11107753 A | * | 4/1999 |
| JP | 2003148144 A | * | 5/2003 |
| JP | 2005343377 | | 12/2005 |

OTHER PUBLICATIONS

Kenji Yoshikawa, Cooling Control Device of on-vehicle Electric Device, May 21, 2003, JPO, JP 2003-148144 A, Machine translation of Description.*

DaimlerChrysler Corporation 2008 Jeep Commander Owner's Manual, First Edition, 5 pages (front cover, inside front cover, back cover and pp. 260-261).

20060505076 RD, May 10, 2006, Anonymous.

* cited by examiner

METHOD FOR REDUCING AUDIBLE NOISE IN A VEHICLE

BACKGROUND OF THE INVENTION

1. Field of the Invention

The present invention relates to a method for reducing perceivable noise in a vehicle and more specifically, to a method for reducing the perceivable audible noise in the interior of a vehicle from rotating components such as fans and blowers.

2. Discussion

Consumers have long associated quiet operation of components in vehicles with quality and luxury. This association is particularly true for automotive vehicles and manufactures of automobiles and related transportation equipment continually strive to reduce noise levels in the interior of vehicles. The primary causes of noise in a vehicle have traditionally been engine noise, air or wind noise, and road noise. While these traditional noises are still the primary cause of noise in the interior of a vehicle, manufacturers have successfully reduced these noises to a level where other noises, traditionally not noticed by consumers, are now part of the list of primary noises heard by the occupants of a vehicle. More specifically, as manufacturers have improved tread design of tires to reduce tire noise, vehicle aerodynamics to reduce air or wind noise, and insulation and other noise reducing technology such as improved seals to reduce audible noise within the interior of the vehicle. With such noise reductions, noises from various rotating components on the vehicle are now audible to consumers and a new source of noise complaint.

One rotational component that traditionally produces audible noise within the vehicle interior, but has become particularly acute and noticed by the occupants of a vehicle due to the overall general noise reductions in the interior of vehicles is the heating and cooling blower fan. Traditionally, consumers directly controlled the speed of the blower or fan and thereby also controlled the amount of noise the fan or blower would produce. Most consumers set the speed of the fan as a balance between the speed which was directly proportional to the amount of cooling or heating provided to the interior of the vehicle against the amount of noise the fan or blower made at the set speed. If the particular speed of a fan was too noisy, the speed would be easily manually adjusted by the consumer. Recently, as more and more vehicles come standard with automatic climate control systems, consumers have lost the ability or have found it difficult to adjust the speed of a fan directly as it is instead automatically controlled by an automatic climate control system. In automatic climate control systems, the system will automatically adjust the speed of the fan to control the amount of hot, cold or fresh air being provided to the interior of the vehicle along with other parameters to maintain or reach a specified temperature level within the interior of the vehicle. Due to this loss of control by occupants of the vehicle, as well as the prevalent change of fan speed by the automatic climate control system to maintain or adjust the interior temperature of the vehicle, and the recent reduction in audible noise in the interior of the vehicle, consumers are increasingly noticing of the noise produced by the heating and fan or blower.

In an attempt to address complaints related to the noise level of the fan or blower, manufacturers have redesigned the shape of the fan blades, vents and other components to reduce audible noise. To maintain efficient movement of air by the vehicle fan, many of these redesigns to the fan shapes are limited. Therefore, it is difficult to obtain any further noise reductions from redesigning the shape of the fan blades or vents and it is desirable to find other ways to reduce the audible noise produced by a rotating components in vehicles, in particular for automatic controlled climate systems where a fan maintains the vehicle temperature without consideration to the noise caused by the fan.

As noise levels in the interior of vehicles have been reduced, some consumers have noticed noise from rotational components other than the heating and cooling fan. These rotational components may be located both within the vehicle compartment and outside of the vehicle compartment. Examples of such other rotating components in the vehicle compartment include electronic cooling fans and other cooling fans, such as, cooling fans include cooling fans for radios, navigational systems, video devices, video displays, CD players and changers, voltage converters and instrument panels. Of course, the previous list is not an exhaustive list of the many rotating components such as fans found in a vehicle. Other cooling fans may include supplemental heating and cooling fans, cooling fans for vehicle seats, and in some vehicles fans for chilling or warming compartments to keep items like beverages either hot or cold within the compartment. An example of a rotating component outside the vehicle compartment is the cooling fan for the radiator and engine. Traditionally these rotating components or fans were not audible to the occupants of the vehicle' due to the existing audible noise in the interior of the vehicle however, with recent noise reduction in the vehicles, these rotating components particularly at stopped states or lower vehicle speeds are now noticeable to the occupants of the vehicle. In particular, these rotating components are noticeable to the occupant of the vehicle as they cycle between on and off states. Therefore, it is desirable to provide a system and control method for reducing the audible noise of certain rotational components within the interior of a vehicle.

SUMMARY OF THE INVENTION AND ADVANTAGES

The present invention is directed to a method for reducing perceivable audible noise in a vehicle and more particularly to a method for reducing the perceivable noise audible to the occupants of a vehicle from rotating components such as fans, including climate control fans, blowers, and other cooling fans on a vehicle.

The method generally includes the step of collecting noise levels within the interior of a vehicle. This collection of noise levels may occur for the overall audible frequency range, selected frequencies, or selected frequency ranges. The collected noise levels may be limited to the frequency range in which the controlled rotational component or components produce noise audible to the occupants of a vehicle. This limits the processing power required by the controller, of course, it should be recognized that all frequencies of audible noise may be collected, however, the controller may ignore all noises except the particular noise of interest, such as only the frequencies of noise the rotational components or components produce noise. With the noise levels collected, they are provided to a controller which the system uses to determine if the noise level exceeds a pre-set maximum level for the particular noise level. The maximum level may be for all of the collected noise levels, or a noise level of selected frequencies or frequency ranges.

If the system determines that the noise levels are acceptable, such as under a maximum noise level or based upon previous experience or preloaded data that adjusting the rotational component will not adjust audible noise levels, the system will not adjust the rotational speed of the rotating component. Instead, the system will cycle through the above steps at regular or predetermined intervals. If it is determined that the rotational speed adjustment of the selected rotational components would be helpful in reducing the audible noise levels, the system will then make the desired adjustments to the rotational speed of the rotational component to adjust the audible noise within the interior of the vehicle.

With the rotational speed adjusted, the system cycles through the above method steps repeatedly until it is determined that no further adjustment is needed or would be helpful, and then reverts to cycling at regular or preset intervals using the above method steps. While most reductions in audible noise occur from a reduction in speed of the rotational component, in some instances, an increase in rotational speed may adjust the total vehicle audible noise to maintain desired noise limits. More specifically, the audible noise from the rotational component has a frequency profile that when it is shifted, may bury the offending portion of the audible noise with other noises or may be used to cancel out other noises. Using live data collected with the input source, such as a microphone, allows determinations to be made regarding the desired speed of the rotational component. To assist with such determinations and to provide for faster determinations, the system may include preloaded noise profiles for the rotational component and in some circumstances for the noise within the vehicle at various rotational speeds and various vehicle speeds.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated and more fully understood by reference to the following detailed description when considered in connection with the accompanying drawing wherein.

DETAILED DESCRIPTION OF THE INVENTION

Figure 1:
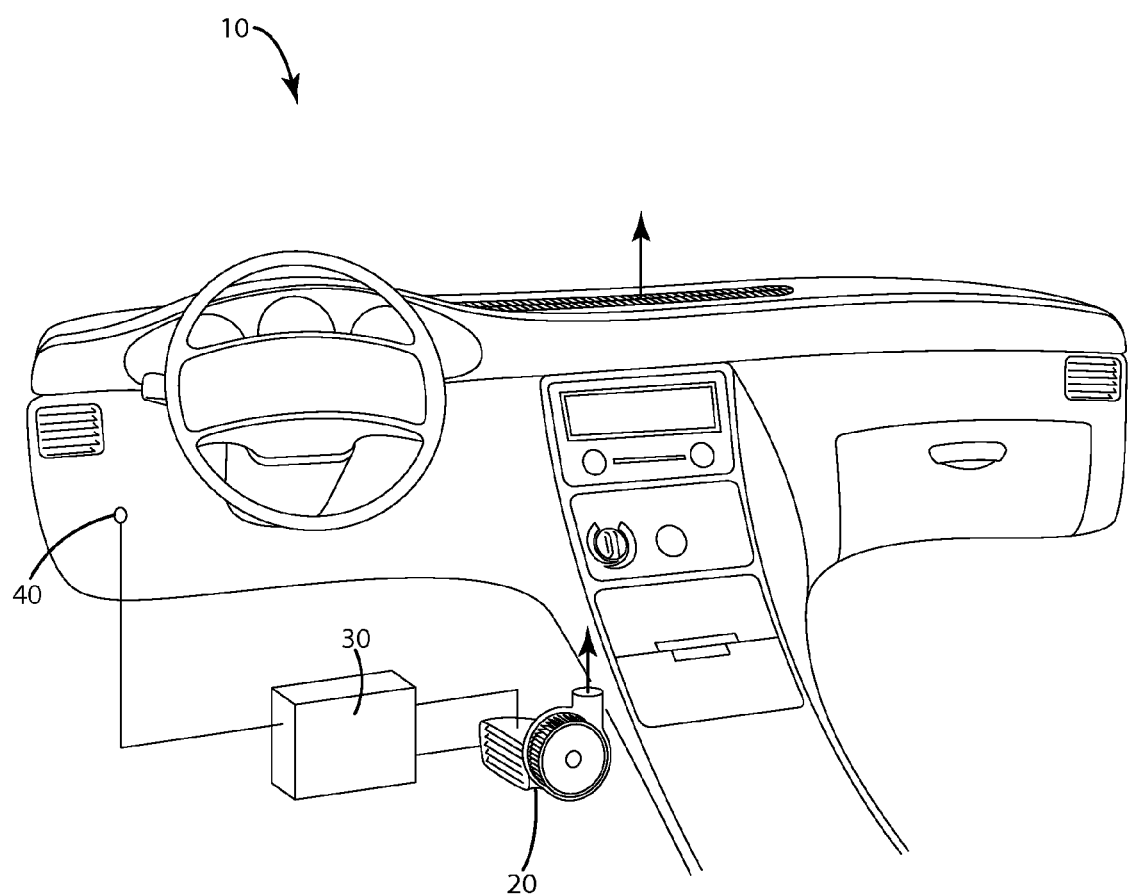
FIG. 1 is a diagram of an exemplary system.
Figure 2:
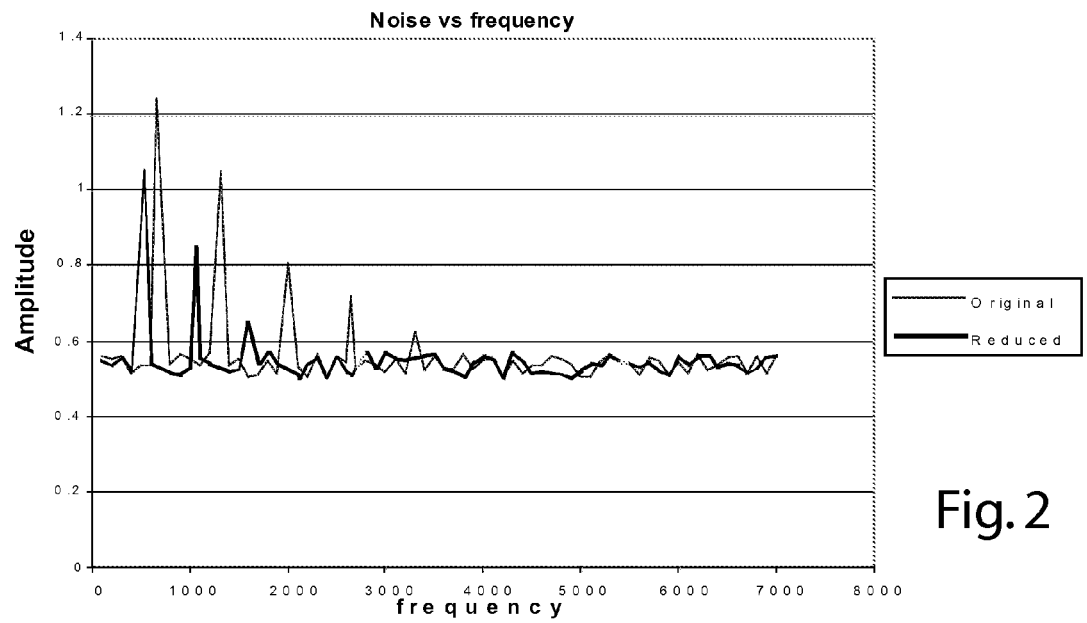
FIG. 2 is an exemplary frequency diagram showing a noise level and a subsequently reduced noise level.
Figure 3:
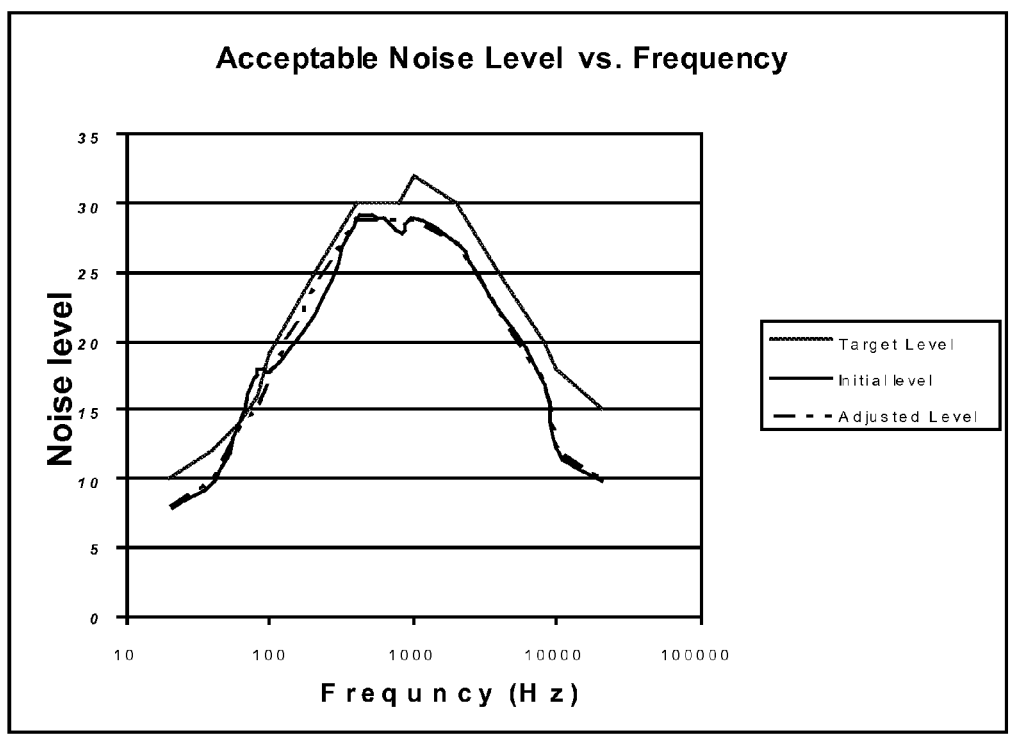
FIG. 3 is a frequency diagram showing a noise level and a subsequently reduced noise level through shifting of the frequencies.

The present invention is directed to a method for controlling noise audible to the occupant of a vehicle using a system such as the exemplary system 10 illustrated in FIG. 1. The system and method may be used in an interior compartment to reduce audible noise, but is particularly applicable to vehicle interiors. As illustrated in FIG. 1, the exemplary system 10 generally includes a rotational component 20, a controller 30, and an input device 40, such as a microphone.

The system 10 may be used in any type of interior space, but is particularly applicable to vehicles such as automobiles, trucks, boats, RVs, and planes. The system 10 is particularly useful in vehicles for sound or noise levels have been reduced which has made noise output from various rotational components increasingly noticeable by the occupants of a vehicle.

Any type of rotational component 20 may be controlled to reduce audible noise. The most common rotational component 20 capable of being controlled to reduce audible noise within the interior of a vehicle are fans and blowers. Examples of fans or blowers audible inside a vehicle are 11 VAC blowers and various cooling fans. Examples of cooling fans are fans used to cool seats, or other electronic components such as DVD players, CD players, CD changers, GPS systems, video displays and instrument clusters. Of course, the above list of exemplary devices including cooling fans is by no means exhaustive and a variety of other cooling fans or any other rotational component may be controlled by the present invention. Examples of other rotational components in a vehicle that may be controlled without detracting from the operation of the vehicle include the radiator and engine fans as well as supplementary HVAC fans.

The controller 30 may be any controller capable of receiving a data from an input source 40 and processing that data to determine if any changes in rotational speed of the rotational component 20 are needed. The controller 30 may be integrated into existing vehicle components or provided as a separate an additional controller. The controller 30 is in communication with the input device 40 and is capable of either directly or indirectly controlling the rotational speed of the rotational component 20. The controller 30 may be capable of receiving various status signals regarding conditions that may change noise levels in the vehicle and also may receive operational feedback information from the rotational component 20.

The controller, more specifically, may be included for example, in the vehicle computer, a processor in the instrument panel or an additional controller. One advantage of including the controller 30 in the vehicle computer is that the vehicle computer already receives many of the various status signals regarding vehicle status that are helpful in a control scheme for the rotational component. If a separate processor is used to run the HVAC system, the controller 30 may be incorporated into this processor as the most-commonly controlled rotational component 20 would be the HVAC fan. Therefore the controller 30 would be easily capable of receiving vehicle status signals such as the desired and current temperatures. In many vehicles, the controller may also be integrated into the vehicle entertainment system as many vehicle entertainment systems now commonly include a voice interface or input device such as a microphone. Any processor capable of running the method of the current invention and receiving the requisite desired vehicle status signals and the noise levels as well as being in either direct or indirect electronic communication with the rotational component may be used as the controller 30.

The input device 40 may be any device capable of collecting noise data or noise levels for a particular frequency, frequency range, various frequency ranges or the audible noise spectrum. The system 10 may use a dedicated and separate microphone or microphone that serves other purposes such as receiving voice commands for the vehicle entertainment system or acts as an input device for various communication systems. To save on manufacturing costs for both parts and installation, it is expected that the input device 40 will be used for multiple purposes such as voice activated controls in a vehicle. Using an input device 40 that acts as a voice input for other vehicle controls or communication systems in the vehicle is particularly advantageous as these are typically tuned to receive audible noises in the vehicle. In some embodiments, the system 10 may use multiple devices 40. The input device 40 will be generally located in a position capable of capturing noise data similar to what is audible to the occupants of a vehicle. In some circumstances, the input device 40 may be tuned or limited to receive only a specific frequency range.

The system 10 generally collects data regarding various noise levels in the interior of the vehicle using the input device 40. The collected noise levels may be for a single frequency, a frequency range, a plurality of frequency ranges or for the complete audible noise spectrum in the vehicle. As used in the specification and claims, noise levels refer to the frequency range that is to be controlled such as the complete audible noise range or any portion or portions thereof collected by the input device 40. The input device 40 is an electronic communication with the controller 30 and provides data regarding noise levels to the controller 30.

The controller 30 uses the collected noise data related to noise levels in the interior of the vehicle to determine if the noise levels exceed a predetermined maximum noise level. The predetermined maximum noise level may be determined by the vehicle manufacturer, by the occupants of the vehicle or by manufacturers of certain components such as the entertainment system in the vehicle. The predetermined maximum noise level may be an overall maximum for an overall noise level, a rotational component maximum noise level for the sound made by the rotational component, or maximum noise levels for certain frequencies, frequency ranges or plurality of frequencies or frequency ranges. The controller 30 may also determine multiple predetermined maximums such as for overall noise levels as well as selected noise level for various frequency ranges. In some circumstances, it is desirable to limit noise levels of certain frequencies or frequency ranges as consumers find these frequencies or frequency ranges particularly undesirable.

If the controller 30 determines that no noise levels exceed selected predetermined maximum noise levels, the controller 30 will continually cycle from receiving collected noise data to determine if the collected noise data exceeds any predetermined maximum noise levels. The system 10 may be programmed to cycle at regular intervals, at random intervals or any predetermined or desirable cycle rate or program.

If the particular noise level is determined to exceed a predetermined maximum noise level, then the system 10 and in particular the controller 30 adjusts the rotational speed of the rotational component 20. After an adjustment is made, the system 10 cycles through the method described above to again collect noise data, determine if any particular noise levels still exceed a predetermined maximum and adjust the rotational component again, if needed. If it is again determined that an adjustment is required, the system makes such an adjustment and then repeats the cycle. Once it is determined that no more adjustments are needed, the system repeats the cycle at intervals as described above.

The system 10 may be configured to make only minor adjustments such that to the occupant of the interior of a vehicle, there is no sharp or significantly noticeable change in rotational speed Minor adjustments are advantageous because the system may cause the audible noise to be reduced below a certain level while minimizing the other effects that reducing the rotational speed of a rotational component 20 may have. For example, reducing the rotational speed of the heating and cooling fan or blower also reduces the cooling or heating capacity of the climate control system. Likewise, reducing the rotational speed of an electronic cooling fan reduces the cooling capacity of the rotational component to that particular electronic component. Therefore, it is advantageous to make minor adjustments whenever possible.

Minor adjustments to the rotational speed of the rotational component also help to prevent oscillating cycles. For example, if a large adjustment is made and then the system quickly determines that such an adjustment is not advantageous to the particular function the rotational component serves, the system may cause the rotational component in particular the noise produced by the rotational component to oscillate. Any oscillation is particularly noticeable to the vehicle occupants and is therefore undesirable. It is also desirable to delay further adjustments after an adjustment has just been made to the speed of the rotational component to prevent oscillations in the speed of the rotational component. This time delay may be set to any desired delay.

In the method of the present invention, the input source 40 collects all of the noise levels. As stated above, the noise levels may be a particular frequency, a plurality of individual frequencies, a frequency range, a plurality of frequency ranges or all audible noise within the vehicle interior. The system 10 may select a particular noise level for review at certain times and other noise levels at other times. The determination of what noise levels to review may depend on a variety of vehicle status signals. For example, when the vehicle is traveling above a set speed and the windows are open, the system may only look for a narrow band of noise levels as all other noise levels the system would typically look for may be irrelevant due to the noise from the windows, moire specifically that any adjustments to address certain noise levels would not provide any beneficial reduction in audible noise levels. The system 10 in some embodiments may even not process or look for any noise levels due to receiving certain vehicle status signals. For example, for vehicles traveling above a speed of 50 mph and having at least one window open, with the rotational component being an HVAC blower which is not operating at a maximum speed, any change in rotational speed would be expected to be unnoticed by the vehicle occupant. Therefore, it is not necessary to reduce rotational speed. Of course, these parameters in vehicle status signals of when to look for particular noise levels and when not look for particular noise levels would be set by the vehicle manufacturer. These parameters may be determined by the vehicle manufacturer through testing and creating noise maps for various vehicle status signals within the vehicle.

If the rotational component 20 being controlled is a cooling fan that is only minimally audible, then typically the system 10 will only control the rotational component under very limited circumstances. As controlling of the rotational component 20, fluctuation of noise level data and determining if the noise levels exceed a predetermined maximum take processing power, it is advantageous to limit when the system cycles through the method of the present invention based upon certain vehicle status signals. This allows a reduction in processing power and may also allow for the processor to handle more components and complete more calculations related to various components without any significant processing demands or requirements for any particular processor. In the example of an electronic cooling fan, as almost any noise may overpower the rotational component, the system 10 may use vehicle status signals to prevent a control method cycle from being implemented. For example, any speed greater than a slow, quiet speed of the vehicle, a high engine RPM, a radio volume above a set level, a sunroof open status signal, a window open status signal, and other vehicle status signals may be used to determine if a particular rotational component does not need to be controlled. By eliminating a particular rotational component from control, the controller 30 does not need to look for particular noise levels related to that particular rotational component. This reduces the processing demands on the controller.

The system 10 determines that no vehicle status signal prevents a control of the rotational component from being initiated, the controller 30 uses the collected noise levels from the input source 40 to determine if the control should be initiated. As described above, the input source 40 typically collects a wide range of frequencies and the controller then selects what noise levels within this wide range of frequencies are further examined in detail.

The controller 30 then selects the noise levels and compares the selected noise levels to the predetermined maximum noise level for the selected noise levels. If the controller 30 determines that a predetermined maximum noise level is exceeded then a control sequence is initiated.

In a control sequence, the controller 30 determines the amount of adjustment needed to the rotational component 20. In simple systems, the controller 30 may reduce the rotational speed and then cycle through the above steps to determine if another adjustment to the rotational speed of the rotational component is needed. In more advanced systems, the controller 30 may be preprogrammed with a noise profile of a particular rotational component 30 and more preferable a noise profile of that rotational component in the vehicle. With a preprogrammed noise profile, the controller already knows how changes in rotational speed will affect the noise profile of the rotational component. This allows for an easy control of the rotational component. It also allows for easier determinations of when moving a frequency may cause the noise levels to be less perceivable. This determination may allow for greater noise reductions than simply reducing the speed of the rotational component. For example, as briefly discussed above and illustrated in the Figures, moving the rotational speed, such as, at times increasing the speed may cause certain peaks on the noise profile of the rotational component to be masked within other portions of the noise in a vehicle, and thereby reduce perceivable noise levels at those frequencies. The rotational component may also cancel out particular noise levels in a vehicle to reduce the noise received from the vehicle and not the rotational component by moving the speed of the rotational component. Although it is expected that a reduction in rotational speed will typically be used, the shifting of the noise profile in some cases may provide a greater benefit to meet overall chicle noise targets.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for reducing audible noise within an interior of a vehicle comprising:
   collecting live data regarding the audible noise levels for a plurality of frequencies using a microphone;
   selecting a particular frequency for review from the plurality of frequencies;
   determining if the collected audible noise level for the particular frequency selected for review from the plurality frequencies exceeds a preset maximum level;
   adjusting a speed of a rotational component to reduce the noise level for the particular frequency.

2. The method of claim 1 further including a step of regularly repeating said steps of collecting live data regarding the audible noise levels for the plurality of frequencies, determining if the collected audible noise level for the particular frequency exceeds the preset maximum level, and adjusting the speed of the rotational component to reduce the noise level for the particular frequency.

3. The method of claim 2 wherein said step of adjusting is time delayed to prevent oscillation of the rotational component.

4. The method of claim 2 wherein said step of adjusting is not performed until multiple cycles of the steps of collecting and determining are performed to prevent oscillation of the rotational component.

5. The method of claim 1 wherein said rotational component has a noise frequency profile and the step of adjusting the speed of the rotational component moves the noise frequency profile of the rotational component.

6. A method for reducing audible noise within an interior of a vehicle comprising:
   collecting noise levels for a plurality of frequencies using a microphone;
   determining if the noise level for a particular frequency selected from the plurality frequencies exceeds a preset maximum level;
   increasing a speed of a rotational component to move a noise frequency profile within other noise frequencies to reduce the noise audible to occupants of the vehicle for the particular frequency.

7. A method for reducing audible noise within an interior of a vehicle comprising:
   collecting data related to audible noise levels within a frequency range using a microphone;
   determining if at least one audible noise level within said frequency range exceeds a preset maximum level;
   determining if any rotational components are operating;
   determining if a current operational state of any operating rotational components contributes to the at least one audible noise level within said frequency range;
   adjusting the operational state of the rotational component to reduce the at least one noise level with said frequency range.

8. The method of claim 7 wherein said step of adjusting the operation state of the rotational component includes the step of decreasing a rotational speed of the rotational component.

9. The method of claim 7 further including the step of receiving a status signal from said rotational component before adjusting the operational state of the rotational component.

10. The method of claim 9 further including the step of not performing said step of adjusting the operational state of the rotational component until the status signal is under a specified level.

11. A method for reducing audible noise within an interior of a vehicle comprising:
   collecting data related to audible noise levels within a frequency range using a microphone;
   determining if at least one audible noise level within said frequency range exceeds a preset maximum level;
   determining if any rotational components are operating;
   determining if a current operational state of any operating rotational components contributes to the at least one audible noise level within said frequency range;
   adjusting the operational state of the rotational component to reduce the at least one noise level with said frequency range; and
   wherein said step of adjusting the operational state of the rotational component includes the step of increasing a rotational speed of the rotational component.

12. A method for reducing audible noise within the interior of a vehicle comprising:

collecting noise levels for a plurality of frequencies using a microphone;

determining if said collected noise exceeds a preset maximum noise level in response to a change in vehicle status relating to a change in an open and closed status of a window; and adjusting a speed of a rotational component to reduce audible noise levels when said collected noise is determined to exceed the preset maximum noise level.

13. The method of claim 12 wherein said steps of collecting noise levels, determining if said collected noise exceeds the preset maximum noise level, and adjusting the speed of a rotational component are repeated until it is determined that the collected noise does not exceed the preset maximum noise level.

14. The method of claim 12 wherein said step of adjusting the speed of rotational component is time delayed to minimize oscillations in speed of the rotational component in response to changes in vehicle status signals.

* * * * *